United States Patent

[11] 3,628,133

| [72] | Inventor | Georg C. E. Dornberger<br>Phoenix, Ariz. |
| --- | --- | --- |
| [21] | Appl. No. | 50,855 |
| [22] | Filed | June 29, 1970 |
| [45] | Patented | Dec. 14, 1971 |
| [73] | Assignee | Western Electric Company, Incorporated<br>New York, N.Y. |

[54] METHODS OF AND APPARATUS FOR DETECTING AND LOCATING OPENS IN CONDUCTORS INCLUDING A SIGNAL GENERATOR MOVABLE WITH THE CONDUCTORS
18 Claims, 5 Drawing Figs.

| [52] | U.S. Cl. | 324/52, 191/12.2 |
| --- | --- | --- |
| [51] | Int. Cl. | G01r 31/08 |
| [50] | Field of Search | 324/51, 52, 54; 191/12.2; 307/150 |

[56] References Cited
UNITED STATES PATENTS

| 2,401,398 | 6/1946 | Wright | 324/54 |
| --- | --- | --- | --- |
| 3,356,940 | 12/1967 | La Frentz | 324/52 |
| 3,370,226 | 2/1968 | Widmer | 324/54 |
| 3,462,682 | 8/1969 | Barnett et al. | 324/54 |

*Primary Examiner*—Gerard R. Strecker
*Attorneys*—W. M. Kain, R. P. Miller and Don P. Bush ABSTRACT: A length of a twisted pair of conductors, which has been wound onto a reel, is tested while the reel is stationary to determine whether either or both of the conductors is open. If any opens are detected, the reel is mounted in a driven, rewinding system to move successive portions of the twisted pair of conductors through a signal-detecting electrode. The pair of conductors is connected to an oscillator which is mounted within the rewinding system without the need of slip rings or the like. The electrode is connected to a detector circuit which controls a meter-relay device to turn off the rewinding system when an open passes through the electrode. Facilities are provided for removing the open portion of the pair of conductors from the electrode for repair purposes and the return of the repaired conductors to the electrode to permit a continuation of the rewinding cycle to locate additional opens.

Patented Dec. 14, 1971 3,628,133

INVENTOR
G.C.E. DORNBERGER
BY [signature]
ATTORNEY

3,628,133

METHODS OF AND APPARATUS FOR DETECTING AND LOCATING OPENS IN CONDUCTORS INCLUDING A SIGNAL GENERATOR MOVABLE WITH THE CONDUCTORS

BACKGROUND OF THE INVENTION

1. Field of the Invention

This invention relates to methods of and apparatus for detecting and locating opens in conductors and, more particularly, relates to methods of and apparatus for detecting opens in twisted pairs of conductors and for locating the detected opens.

2. Description of the Prior Art

Presently used systems for locating opens in conductors require that the signal generating facilities be located externally of any moving system which passes the conductors being tested adjacent to a signal-sensing electrode. Systems of this type require some sort of facility for transferring the generated signal from a stationary signal generator to the moving conductors. This procedure required slip rings or a similar device to couple the signal to the conductors.

Other means such as reactive coupling can be provided for coupling the signal to the moving conductors. However, the testing procedure functions more efficiently when the generated signal is applied directly to conductors.

The signal which is picked up by the electrode is fed to a detector circuit wherein the signal must be amplified in order that the condition of the conductors can be properly analyzed. Usually, noise and spurious signals appear with the detected signal and it is sometimes difficult to distinguish the signal appearing in the conductors from the noise and spurious signals.

SUMMARY OF THE INVENTION

It is, therefore, an object of this invention to provide new and improved methods of and apparatus for detecting and locating opens in conductors.

Another object of this invention is to provide new and improved methods of and apparatus for detecting and locating opens in conductors where slip rings and the like are not required to feed a signal to the conductors being tested.

Still another object of this invention is to provide new and improved methods of and apparatus for detecting opens in conductors where the presence of a signal in a detector is clearly distinguishable over noise and spurious signals to indicate continuity in the tested conductors.

Methods of detecting and locating opens in conductors illustrating certain principles of the invention may include the steps of applying a signal to a conductor being tested, coupling the signal from the conductor to a signal-detecting indicator, causing relative movement between successive sections of the conductor and the coupling of the signal, causing at least a portion of the conductor to move, and connecting the applying of the signal to an adjacent portion of the conductor so that the applying of the signal is permitted to be moved with the conductor.

Apparatus for detecting and locating an open in at least one conductor being tested illustrating certain principles of the invention includes means for applying a signal to the conductor, means responsive to the signal for indicating continuity in the conductor and responsive to the absence of the signal for indicating discontinuity in the conductor, means for reactively coupling the signal from the conductor to the indicating means, means for causing relative movement between successive sections of the conductor and the means for coupling and for causing at least a portion of the conductor to move, and means for connecting the signal applying means to an adjacent portion of the conductor under test and for supporting the signal applying means in a fixed relationship with respect to the adjacent portion of the conductor to which it is connected and causing the signal applying means to move with the adjacent portion of the conductor to which it is connected.

BRIEF DESCRIPTION OF THE DRAWINGS

Other objects and advantages of the present invention will be apparent from the following detailed description when considered in conjunction with the accompanying drawings in which.

DETAILED DESCRIPTION

Figure 1:
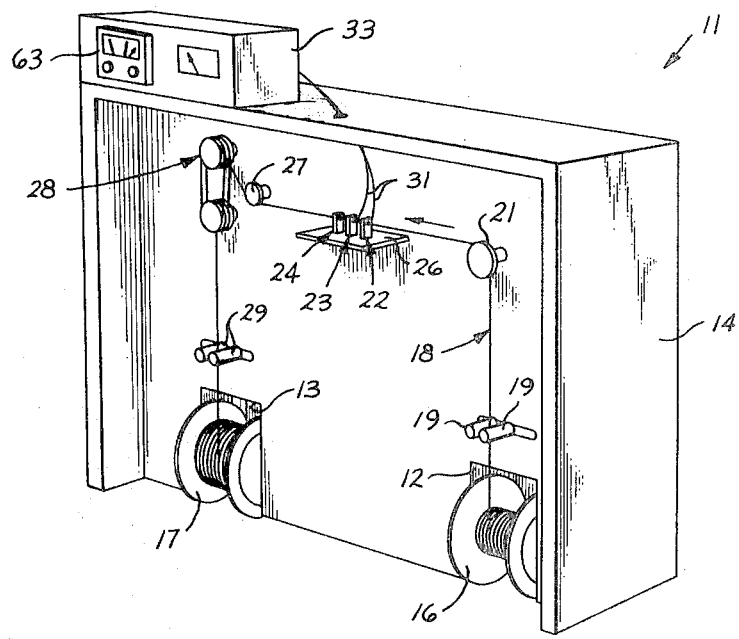
FIG. 1 is perspective view showing a rewinding apparatus used to move conductors being tested.

Referring to FIG. 1, there is illustrated a rewinding apparatus, designated generally by the numeral 11. A pair of reel-support wells 12 and 13 are formed in a housing 14 of the rewinding apparatus 11 and support therein a supply reel 16 and a takeup reel 17, respectively, for a twisted pair of conductors, designated generally by the numeral 18. The twisted pair 18 of conductors is passed from the supply reel 16 through guide rollers 19—19 of a distributor (not shown), over a guide sheave 21. The pair 18 is then passed through a pair of in-line electrode assemblies, designated generally by the numerals 22 and 23, and then through a vibration stabilizer, designated generally by the numeral 24. The electrode assemblies 22 and 23 and the stabilizer 24 are positioned and supported on a shelf 26 which extends horizontally from and is supported by the housing 14.

The pair 18 of the conductors is passed under a guide sheave 27, around an accumulator, designated generally by the numeral 28, through a pair of guide rollers 29—29 of a distributor (not shown) and onto the takeup reel 17. The electrode assemblies 22 and 23 are connected by conductors 31—31 to a signal-detecting circuit, designated generally by the numeral 32 and illustrated in FIG. 5, which is contained within a housing 33 mounted on top of the frame 14.

Figure 2:
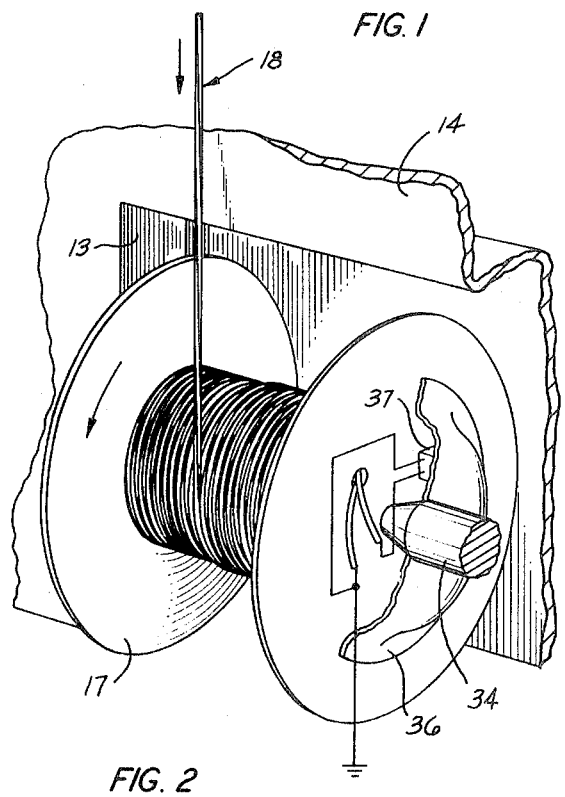
FIG. 2 is a partial perspective view with parts broken away for clarity showing a reel-support arrangement with a signal generator attached thereto embodying certain principles of the invention.

Referring to FIG. 2, there is illustrated the takeup reel 17 positioned within the associated reel-support well 13. The supporting facilities include a pair of spaced, axially aligned shafts 34—34 (one shown) having end portions between which the reel 17 is positioned, which are movable axially to engage and raise the reel from the floor of the well and support the reel for rotation. A pair of friction-gripping discs 36—36 (one shown) are movable axially over the shafts 34—34 to engage outer flange portions of the reel 17 to provide a rotary drive coupling for the reel.

As further illustrated in FIG. 2, a packaged container 37 is mounted fixedly to a portion of an inner wall of one of the discs 36—36 and is positioned within an enclosure formed by the inner wall of the disc and the adjacent flange portion of the reel 17 when the disc is moved into engagement with the flange portion. The container 37 provides a housing for a signal-generating oscillator, designated generally by the numeral 38 and illustrated in FIG. 5, and permits the oscillator to be moved with the rotation of the reel 17 and also to be connected directly to the ends of at least one of the pair 18 of the conductors. This support and connection arrangement eliminates the need for slip rings or the like.

Figure 3:
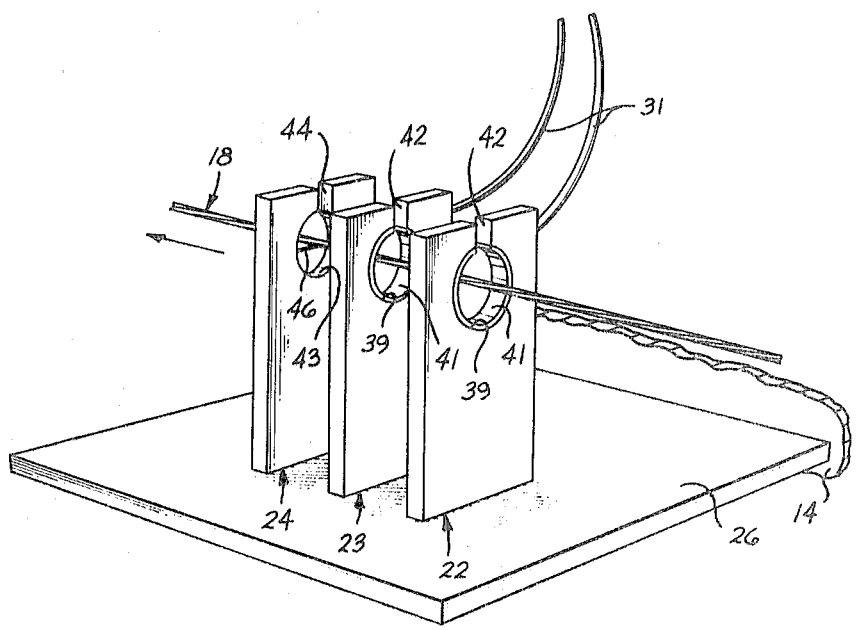
FIG. 3 is a perspective view showing an electrode for coupling a signal appearing in a conductor being tested to an open detector and locator circuit embodying certain principles of the invention.

As illustrated in FIG. 3, the electrode assemblies 22 and 23 are each formed with a substantially circular opening 39 which supports a ringlike, metal-lined electrode 41 therein.

The electrode assemblies 22 and 23 can be composed of any suitable insulating material and are mounted in spaced relation with the axes of the openings 39—39 being aligned. Each of the electrode assemblies 22 and 23 is formed with a slot 42 which extends through the top surface thereof and into the opening 39. During the test period, it may be desirable to withdraw the pair 18 of the conductors from within the electrode assemblies 22 and 23. The slots 42—42 permit easy withdrawal of the pair 18 from the electrode assemblies 22 and 23 and the return of the pair therein.

As further illustrated in FIG. 3, the vibration stabilizer 24 is formed with an opening 43 and a communicating slot 44. In addition, a fiber strand 46 is extended horizontally between opposite-shaped portions of the wall of the opening 43. The stabilizer 24 is positioned on the shelf 26 spatially of the electrode assembly 23 and with the opening 43 thereof substantially in axial alignment with the openings 39—39 of the electrode assemblies 22 and 23. Although not shown, the electrode assemblies 22 and 23 are formed to facilitate the connecting of the conductors 31—31 to the associate electrodes 41—41. In addition, facilities are provided for maintaining the fiber strand 46 in a relatively taut condition.

Figure 4:
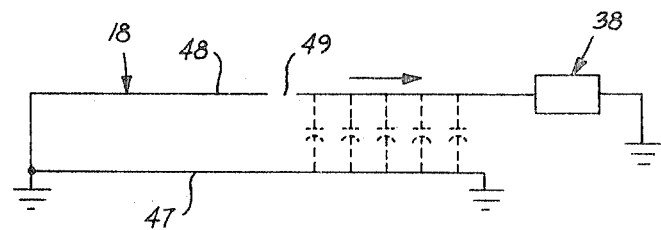
FIG. 4 is an electrical diagram showing conductors being tested, with capacitance distributed between the conductors and a signal generator connected to the conductors.

As illustrated in FIG. 4, the pair 18 of the conductors includes insulated conductors 47 and 48 which are normally twisted together and having distributed capacitance therebetween as illustrated in dotted lines. The signal generation oscillator 38 has one of two output terminals connected to one end of the conductor 48 which has an open appearing at 49. The other terminal of the oscillator 38 is connected to ground. The adjacent end of the conductor 47 and the other end of both of the conductors 47 and 48 are also connected to ground. The oscillator 38 is attached to the disc 36 (FIG. 2) which is associated with takeup reel 17 (FIG. 2) so that the pair 18 of the conductors is moving in the direction of the arrow illustrated in FIG. 4.

The adjacent portions of the conductors 47 and 48, which are between the oscillator 38 and the open 49, normally conduct the oscillating signal through the capacitance which is illustrated in dotted lines. The portions of the conductors 47 and 48 which appear on the other side of the open 49 will not conduct the oscillating signal due to open circuit which results from the open 49.

Figure 5:
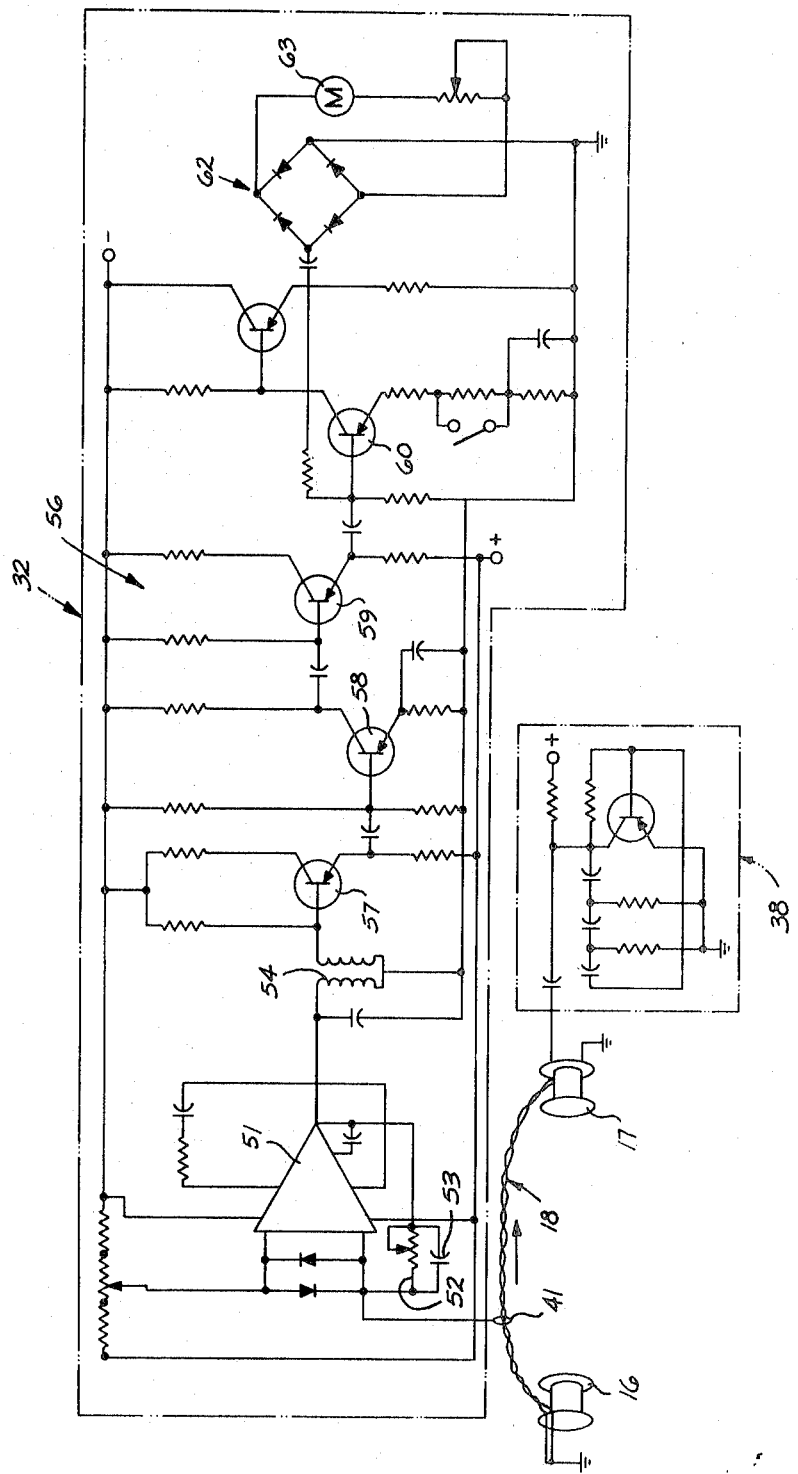
FIG. 5 is an electrical schematic showing the circuit configuration of a signal generator connected to conductors being tested with a signal detecting circuit connected to an electrode through which the conductor passes.

As illustrated in FIG. 5, the signal-detecting circuit 32 has one two-external terminals connected to the electrodes 41—41 (one shown) and the other terminal connected to ground which is common throughout the entire system. The signal-detecting circuit 32 includes an operational amplifier 51 which operates in a conventional manner. The input of the amplifier 51 is connected directly to the electrodes 41—41 and receives the incoming signal picked up by the detectors. The output of the operational amplifier 51 is fed back in a conventional manner but is passed through a parallel RC circuit including a resistor 52 and a capacitor 53. The values of the resistor 52 and the capacitor 53 are closed to curtail unwanted noise which may appear with the signal picked up by the electrodes 41—41 from the twisted pair 18 of the conductors.

Since the coupling of the signal between the twisted pair 18 of the conductors and the electrodes 41—41 is not through a direct connection, but is through a reactive coupling such as a capacitive coupling between the pair and the electrodes, the signal which appears at the input of the operational amplifier is of a very low amplitude. Any noise which also appears at the input of the operational amplifier 51 may tend to override and conceal the desired signal to the extent that it is not detectable. By using the RC circuit in the feedback loop of the operational amplifier 51, the unwanted noise is substantially eliminated and the desired signal is fed from the output of the amplifier to an isolation transformer 54.

The resistor 52 is variable to permit the selection of one of several resistance values to curtail the noise at various frequencies.

The isolation transformer 54 serves to eliminate spike noise signals which may appear at this point in the circuit so that only the desired signal is fed through an amplifier circuit, designated generally by the numeral 56, which includes transistors 57 through 61. Each of the transistors 57, 59 and 61 form a portion of emitter-follower circuits which function as buffers between amplifier circuits which include transistors 58 and 60.

The output of the amplifier circuit 56 is fed to a rectifier, designated generally by the numeral 62 whereat the signal is rectified. The rectified signal is then fed to a DC meter-relay unit 63 such as meter-relays commercially available from API Instruments Co. of Chesterland, Ohio.

The meter-relay unit 63 includes relays which operate at selected values of current. The unit 63 further includes control knobs 64—64 (FIG. 1) externally of the unit which permit an operator to set the current values at which the relays will operate.

The oscillator 38, which is a conventional transistorized oscillator, is packaged within the container 37 (FIG. 2) and includes its own power source within the container.

As illustrated in FIG. 1, the leading end of the twisted pair 18 of the conductors is drawn from the supply reel 16, passed over the sheave 21, through the electrodes 41—41 and the stabilizer 24, over the sheave 27, around the accumulator 28 and attached to the takeup reel 17. A driving system (not shown) drives both the supply reel 16 and the takeup reel 17 at speeds which maintain the twisted pair 18 of the conductors in a taut condition. A preferable linear speed for the pair 18 is 1,500 feet per minute.

As illustrated in FIGS. 2, 4 and 5, one side of the oscillator 38 is connected to one conductor 48 (FIG. 4) of the twisted pair 18 of the conductors and the other side is connected to the common ground of the entire system. In addition the remaining three ends of the pair 18 of the conductors are connected to ground. It is noted that, preferably, the oscillator 38 is mounted mechanically on the disc 36 which is associated with the takeup reel 17 and that the leading end of the conductor 48 (FIG. 4) of the twisted pair 18 of the conductors is connected electrically to the one terminal of the oscillator.

The electrical operation of the oscillator 38 causes a signal to be fed through the conductors 47 and 48. Since the conductors 47 and 48 are relatively close to each other, the capacitance (FIG. 4) between these conductors provides a path for the signal back to the oscillator through the ground connection. As the twisted pair 18 of the conductors passes through the electrodes 41—41, the oscillating signal is coupled reactively to the electrodes and subsequently to the signal-detecting circuit 32.

Initially the noise appearing with the signal is substantially eliminated so that only the signal remains even though the amplitude of the signal is low. The signal is then coupled through the amplifier circuit 56 and the rectifier 62 whereby sufficient DC current is supplied to move a meter needle of the meter-relay unit 63 to a normal operating deflection position which indicates that the portions of the twisted pair 18 of the conductors which have passed through the electrodes 41—41 are continuous.

When the open 49 (FIG. 4), and subsequent portions of the pair 18, appears within the electrodes 41—41, the signal does not appear in the conductors 47 and 48 at this point and substantially no signal appears in the signal-detecting circuit 32. The needle of the meter-relay unit 63 then starts to move toward a zero reading from the normal operating position. As the current level in the meter-relay unit 63 passes an upper predetermined value, which is below the current level for the normal operating position, the operating power is removed from the driving system to stop the forward movement of the pair 18 of the conductors. Since the pair 18 was traveling at a relatively high rate of speed, the open 49 in the conductor 48 has passed the electrodes 41—41. Therefore, the direction of movement of the pair 18 has to be reversed in order to bring the open 49 in the general vicinity of the electrodes 41—41.

The operator initiates movement of the pair 18 of the conductors by operating a control circuit (not shown) which permits the drive system to override the previously cutoff condition established when the meter needle passed the upper predetermined value. The linear speed of the pair 18 of the conductors in the reverse direction is 100 feet per minute. Since the open 49 in the conductor 48 is now between the electrodes 41—41 and the oscillator 38, substantially no current appears in the signal-detecting circuit 32 and, consequently, the meter needle of the meter-relay unit 63 remains on the zero reading.

As the open 49 of the conductor 48 passes through the electrodes 41—41, the signal is again detected and the meter needle starts to move to some above-zero reading. When a preset low-current level, which is lower than the previously mentioned upper level, is reached, the driving system is again turned off automatically to stop the movement of the pair 18 of the conductors in the reverse direction. Since the pair 18 was traveling at a relatively slow speed, the pair stops rather quickly so that the open 49 is substantially adjacent to the electrode 41 which is associated with the electrode assembly 22.

The operator can now remove the portion of the pair 18 from the electrode assemblies 22 and 23 and the stabilizer 24 and repair the open 49 to make that portion of the conductor 48 continuous. The pair 18 is then returned to the original test position within the electrode assemblies 22 and 23 and the stabilizer 24 and the pair is again moved in the forward direction to continue to detect and locate opens which may be in the remaining trailing portions of the conductors 47 and 48.

It is noted that the described connection, as illustrated in FIG. 4, will facilitate detection of opens appearing in either conductor 47 and 48. When the first detected and located open is repaired, the pair 18 can be moved in the forward direction through the electrodes 41—41 to continue to search for, detect and locate subsequent opens.

In addition, while the particular embodiment of the invention, which is shown and described, includes only the pair 18 of the conductors, a cable unit containing many pairs could be passed through the electrodes 41—41 and the pairs within the unit could be selectively activated by feeding the oscillating signal thereto. Other arrangements could be used to test the different pairs, such as using different frequencies for the various signals to simultaneously test the several pairs of a cable unit without departing from the spirit and scope of the invention. Additionally, a single conductor could be tested in the same manner as that described for the pair 18 without departing from the spirit and scope of the invention. For example, a single conductor could be looped so that a midportion of the conductor would assume the relative location of the commonly grounded ends of the conductors 47 and 48 as illustrated in FIG. 4. The ends of the single conductor would be connected to the oscillator 38 and the common machine ground.

The utilization of the packaged oscillator 38 with the rotating system of the reel 17 and the disc 36 permits the open detecting and locating system to be completely self-contained and does not require external power and signal-generating means with noise-generating slip rings and the like. In addition, the need for constant replacement of the slip rings and associated facilities because of wear has been eliminated.

I claim:

1. A method of detecting and locating at least one open in conductor being tested, which comprises the steps of:
   applying a signal of a signal generating means to a conductor being tested for the detection and location of at least one open in the conductor,
   coupling reactively by a coupling device the signal from portions of the conductor to an indicator to indicate continuity in the portions of the conductor when the signal is present,
   moving successive sections of the conductor adjacent to the coupling device to detect the presence of the signal in the successive sections as an indication of continuity in the conductor so that when the signal is not detected an open in the conductor is indicated and located adjacent to the coupling device, and
   connecting the signal generating means directly to the adjacent portion of the conductor to move with the adjacent portion.

2. A method of detecting and locating at least one open in a pair of conductors being tested, which comprises the steps of:
   applying a signal from a signal-generating means between a pair of conductors being tested,
   moving successive sections of the pair of conductors through an electrode which picks up the signal in the successive sections of the pair of conductors,
   feeding the signal from the electrode to a signal-detecting device as an indication of continuity in the successive sections of the pair of conductors, and
   connecting the signal-generating means directly to moving portions of the pair of conductors so that the means are permitted to move with the moving portions of the pair of conductors to which it is connected.

3. A method of detecting and locating at least one open in a pair of conductors as set forth in claim 2 which further comprises the step of stabililizing the movement of the pair of conductors as the pair is moved through the electrode.

4. A method of detecting and locating at least one open in a pair of conductors as set forth in claim 2 wherein the pair of conductors are one of several pairs of conductors bound together to form a cable unit.

5. A method of detecting and locating at least one open in a pair of conductors as set forth in claim 2 which further comprises the step of eliminating noise signals appearing with the signal to preclude erroneous indication of the test.

6. A method of detecting and locating at least one open in a pair of conductors as set forth in claim 2 which further comprises the step of automatically stopping the movement of pair of conductors when the signal is not appearing in the section of the pair passing at that instant through the electrode as an indication of an open in the pair.

7. A method of detecting and locating at least one open in a pair of conductors as set forth in claim 6 which further comprises the step of moving the pair of conductors in at least a reverse direction after the initial movement of the pair has been stopped until the signal is detected in the pair to indicate the location of the open.

8. Apparatus for detecting and locating an open in at least one conductor being tested, which comprises:
   means for applying a signal to a conductor being tested for the detection and location of at least one open in the conductor being tested,
   means responsive to the application of the signal to the conductor for indicating continuity in the conductor and responsive to the absence of the signal for indicating discontinuity in the conductor being tested,
   means for reactively coupling the signal from the conductor to the means for indicating,
   means for causing adjacent relative movement between successive sections of the conductor being tested and the means for coupling and for causing at least a portion of the conductor to move, and
   means for connecting the signal applying means to an adjacent portion of the conductor under test which is moved and for supporting the signal applying means in a fixed relationship with respect to the adjacent portion of the conductor under test to which it is connected and causing the signal applying means to move with the adjacent portion of the conductor to which it is connected when causing relative movement between the adjacent successive sections of the conductor and the means for coupling the signal during a detecting and locating operation.

9. Apparatus for detecting and locating at least one open in a pair of conductors being tested, which comprises:
   means for applying a signal between a pair of conductors being tested for the detection and location of at least one open in the conductors, means responsive to the application of the signal thereto for indicating continuity in the conductors and responsive to the absence of the signal for indicating discontinuity in at least one of the conductors being tested, means for coupling the signal from the conductors to the means for indicating, means for moving relatively the conductors and the means for coupling so that successive portions of the pair of conductors are moved adjacent to the means for coupling, and means for connecting directly the signal-applying means to adjacent portions of the pair of conductors being tested and supporting the signal-applying means in a fixed relationship with the adjacent portions of the pair which are moved so that the signal-applying means moves with the adjacent portions to maintain the direct connection.

10. Apparatus as set forth in claim 9 which further comprises means for stablilizing the movement of the pair of conductors as the pair and the coupling means are moved relatively.

11. Apparatus as set forth in claim 9 wherein the pair of conductors form one pair of a plurality of pairs of conductors bound together to form a cable unit which is moved relative to the coupling means to detect and locate opens in the pairs of the cable unit.

12. Apparatus as set forth in claim 9 which further comprises means for eliminating noise signals within the indicating means to preclude erroneous indication of the continuity condition of the pair of conductors being tested.

13. Apparatus as set forth in claim 12 wherein the noise eliminating means includes an operational amplifier through which the signal of the signal-applying means is passed after the signal is coupled from the pair of conductors to the coupling means and a resistor and capacitor circuit in a feedback loop of the amplifier.

14. Apparatus as set forth in claim 9 which further comprises means to stop relative movement of the pair of conductors and the coupling means when the signal is not appearing in the section of the pair passing at that instant adjacent to the coupling means.

15. Apparatus as set forth in claim 14 which further comprises means for moving relatively the pair of conductors and coupling means in a reverse direction after the initial movement of the pair has been stopped until the signal is detected in the pair to indicate the location of an open.

16. Apparatus for detecting and locating at least one open in a pair of conductors being tested, which comprises:

a moving support for moving and taking up a pair of conductors being tested, a signal-coupling electrode, successive portions of the pair of conductors being moved adjacent to the electrode by the moving support prior to taking up the pair thereon, a self-powered signal generator mounted on the moving support and connected directly to an adjacent portion of the pair of conductors on the moving support to permit the generator to continuously feed a signal and be connected to the pair while the successive portions of the pair of conductors are being moved adjacent to the electrode and taken up on the moving support, and means connected to the electrode for detecting the presence and absence of the signal in the successive portions of the pair of conductors passing adjacent to the electrode to thereby locate an open in the pair.

17. Apparatus as set forth in claim 16 wherein the signal-coupling electrode is generally a metallic ring through which the pair of conductors pass.

18. Apparatus as set forth in claim 17 wherein the metallic ring of the electrode is formed with an opening through which the pair of conductors can be moved laterally out of the ring to facilitate repair of a detected and located open.

* * * * *